2,891,872

HIGH CARBON PRINTING INKS

Andries Voet, Borger, Tex., assignor to J. M. Huber Corporation, Borger, Tex., a corporation of New Jersey No Drawing. Application November 8, 1955
Serial No. 545,774

16 Claims. (Cl. 106—28)

This invention relates to printing inks and more particularly to inks composed principally of carbon black dispersed in a predominantly hydrocarbon vehicle and adapted for use on high speed perfecting presses.

Increased printing speeds have imposed stringent demands on news inks. News inks fashioned in a manner similar to lithographic inks and containing 12 to 18 parts of carbon in a vehicle composed of a lithographic varnish or a varnish composed of large quantities of rosin, stearin pitch, gilsonite or other resins dissolved in a mineral oil have proved unsuitable for tank storage and modern distribution systems because of their extreme thixotropic nature. Most of such inks will not operate on a high speed web press because the body of the ink lacks sufficient fluidness, causing the paper to pick or tear. One approach to overcoming this difficulty has been a reduction in the carbon content of news inks until they now generally consist of 10 to 14% of carbon ground in a mineral oil containing a few percent of a conditioner such as aphalt or gilsonite. The carbon content of such inks is so low as to be unsatisfactory for many purposes so far as concerns blackness of print.

Deficiencies of present news inks are due to the inability to formulate inks which remain fluid and at the same time have body characteristics which permit satisfactory operation on a web press performing at high speed as to effect sufficient carbon concentration when printed to result in a desirably black imprintation without objectionable show-through. Attempts to use large amounts of carbon in a mineral oil vehicle containing only small amounts of resins or asphalts produce a body which backs away in the fountain. Large amounts of resins produce temporary good flow but flocculation of the carbon on short periods of rest will convert the ink into a gel. Such inks cannot be readily handled in bulk. The substitution of bodied linseed oil usually produces some improvement in the body but such inks are still overly thixotropic and in addition have sufficient tack to pick or tear the paper at only moderately high speed printing.

Accordingly, it is a principal object of this invention to provide inks of high carbon content having improved flow properties, and more particularly to provide this type of ink having a predominantly hydrocarbon vehicle and adapted for use in high speed "perfecting" or "web" presses.

Another object is to produce news inks which give blacker printing and less show-through on a printed sheet.

Another object is to produce news inks which are essentially non-misting under high speed printing conditions.

Other objects of the invention will in part be obvious and will in part appear hereinafter.

The present invention is a continuation-in-part of my copending application Serial No. 427,340, filed May 3, 1954.

The objects of the invention are accomplished by providing a printing ink with a vehicle composed of a dispersing agent and an antiflocculent in the presence of an essentially mineral oil hydrocarbon, the hydrocarbon constituting at least about 80% by weight of the vehicle, carbon dispersed in the vehicle to at least 16% by weight of the ink, the ratio of yield value, in dynes per sq. cm., to plastic viscosity, in poises, of the dispersion, being less than about 70 at 30° C.

The printing process consists essentially in filtering a layer of carbon out of an ink film and onto the surface of the sheet of paper. Blackness of print will depend on the amount of carbon which is filtered from the ink film. The amount of carbon filtered onto the paper depends on the amount of ink film deposited per unit surface and upon the concentration of carbon in the ink film. Conversely, when using inks having hydrocarbon vehicles, these factors determine the amount of oil penetration and show-through of the printed matter. They also control, to a great extent, the time required for removal of enough oil so that the printed matter is sufficiently rigid to prevent offset and smudging. Finally, since the ink filaments which are responsible for misting are drawn from the ink film, it follows that these two factors will reflect the amount of misting which results.

Ink systems are seldom Newtonian liquids but require a force greater than a yield value to initiate the flow and a greater force to maintain the flow. The flow characteristics are readily determinable by known methods which involve essentially measuring the resistance to flow at increasing rates of shear. The rate of shear in reciprocal seconds is then plotted as ordinate against the resistance to flow in dynes per sq. cm. as abscissa. As the rate of shear is increased the plot tends to assume the form of a straight line. Extrapolation of the straight portion of this curve back to the abscissa gives the yield value in dynes per sq. cm. The cotangent of this line with the abscissa gives the plastic viscosity in poise.

Both yield value and plastic viscosity are important in determining the working properties of the ink, neither a high viscosity nor a high yield value being desirable. However, the relation between these two values has been found a desirable criterion for evaluating the properties of the ink. I have now found that inks in which the yield value in dynes per sq. cm. divided by the plastic viscosity in poises is less than about 70 will distribute and print satisfactorily on high speed perfecting presses.

Satisfactory blackness on newsprint may be obtained by applying about 2.7 grams of carbon per square meter of covered surface. When a news ink containing 10% of carbon is employed the application of 2.7 grams of carbon will add 24.3 grams of oil and the transparency of the paper will be greatly increased. Experiments have shown that it is necessary to reduce the oil to about 15 grams per square meter before the transparency of ordinary newsprint is largely eliminated and the best results are obtained when not more than 11 grams are added. The following table shows the amount of oil transferred from inks of various carbon contents when 2.7 grams of carbon are printed:

| Grams carbon in 100 grams of ink: | Grams of oil added to paper |
|---|---|
| 9.8 | 25 |
| 10.8 | 20 |
| 15.3 | 15 |
| 17 | 13 |
| 19.6 | 11 |
| 25.2 | 8 |

The use of inks of high carbon content permits printing with much thinner ink films. Thinner films will in turn virtually eliminate misting even in high speed web type presses. The amount of misting from inks of various carbon contents has been measured by applying a quantity of ink, containing a known percentage of carbon, to the rolls of a mist testing machine and collecting the mist devolved from the separating side of two contacting ink rollers. The mist is caught on weighed pieces of aluminum foil of a given area and the increase in weight determined. The following table shows the advantages of the use of inks containing more than about 16% of carbon:

| Percent carbon in ink: | Milligrams of mist |
|---|---|
| 10 | 20.0 |
| 12 | 14.0 |
| 14 | 4.0 |
| 15 | 1.5 |
| 16 | 1.0 |
| 18 | 0.4 |
| 20 | 0.0 |

The use of moderate amounts of dispersing agents in addition to dispersing the carbon will add certain quality of flow to low carbon content inks but not to high carbon content inks which nonetheless will flocculate on cessation of agitation. However, it has now been found that non-flocculating high carbon content inks can be produced by the addition of antiflocculents in the presence of dispersing agents. This addition serves to retain the dispersed condition of the carbon, which is obtained when agitation is discontinued, thus overcoming the objectionable thixotropic character of the ink. It should be pointed out that dispersing agents do not function as antiflocculents to more than a minor and insignificant extent and antiflocculents do not act as dispersing agents, both agents being necessary to prepare and maintain a satisfactory high carbon ink.

Dispersing agents which improve the flow characteristics to low carbon content inks consist of such materials as gilsonite, asphalts, fluid or semi-solid tars obtained as residues from petroleum refining, rosin or limed rosin and the like. Bodied drying oils and modified drying oils have like qualities if used in considerable amounts. Dispersing agents having these characteristics can be recognized by the addition of 2% to 5% to a grind of 12 parts channel black in 88 parts of white mineral oil. Before the addition the ink tends to drop in chunks from a spatula while after the addition it will flow in a long string.

Certain partially refined mineral oils can be obtained containing partially oxidized and polymerized tars which act as dispersing agents. The oils themselves are dark in color and on vacuum distillation give a black waxy deposit which effectively disperses carbon black. The dispersing agent required to produce the inks of this invention can be supplied partially or entirely by the use of such tarry petroleum residues.

Among the materials we have found to be useful as antiflocculents are various salts of mahogany acids and particularly the alkaline earth salts such as the barium and calcium, as well as the dibutylamine salts of mahogany acids. Also, high molecular weight oil soluble substances such as dehydro abietyl amine and sorbitol sesquioleate perform satisfactorily as antiflocculents. The effect of such substances can be shown in the following manner: An ink composed of 12 parts of channel carbon, 3 parts of dispersing agent such as gilsonite and 83 parts of a mineral oil is first prepared. This ink is divided into two portions. To the first portion 4% of its weight of mineral oil is added and to the second portion 4% of its weight of antiflocculent. Portions of each ink are placed in test tubes and held at about 50° C. for four to eight hours and the tubes are then examined in a dark room with ultraviolet light. The sample containing no antiflocculent will fluoresce a pale blue due to syneresis and separation of oil. The fluorescence may be particularly strong over extended patches due to the free oil which collects on the glass. The treated sample will show only a minor amount or be completely free of fluorescence.

Satisfactory ink compositions are illustrated by the following examples:

*Example 1*

An ink was prepared by dispersing 25 parts of channel carbon black in a mixture of 68 parts of a medium viscosity mineral oil and 7 parts of a liquid tar from petroleum refining which acted as a dispersing agent. This ink was of a heavy buttery nature. To this buttery material 4 parts of a 50% solution of the neutral barium salt of mahogany acid in mineral oil was added. The resulting ink flowed readily and printed in a satisfactory manner on a newspaper press operating at a speed of 1200 feet per minute. The ink has a viscosity at 30° C. of 19.2 poises and yield value of 10 dynes per sq. cm. The ratio of yield point to viscosity was 0.5. The ink retained its flow properties after two months' storage.

This ink was compared on a high speed newspaper press with a control sample of normal ink containing 11% of carbon. In the first case the experimental ink was printed with the same film thickness of ink as the control sample. No flooding of plates resulted and the print was extremely black and there was much less show-through than with the control. The fountain was then adjusted to reduce the ink film of experimental ink so that a normal amount of carbon was applied to the paper. No misting was observed with the experimental ink and show-through was reduced to that due to the normal transparency of the paper.

*Example 2*

An ink was prepared containing 20 parts of a fine particle size furnace carbon, 3 parts of gilsonite and 77 parts of a medium viscosity mineral oil. This ink was of a short consistency. The addition of 5% of mineral oil to a portion of this ink did not produce an ink with satisfactory flow. The addition of 5% of a 50% solution of the barium salt of mahogany acid in mineral oil produced an ink with good flow and of good printing quality. The viscosity of this ink at 30° C. was 18.9 poises and the yield value was 990 dynes per sq. cm. The ratio of yield value to viscosity was 52. This ink flowed readily without agitation after three months' storage.

*Example 3*

A mixture was prepared containing 17 parts of a high color channel carbon and 71 parts of medium light mineral oil. The resulting mixture was a heavy paste. This was treated with 7 parts of a tarry petroleum residue dispersing agent and 5 parts of 50% neutral barium mahogany salt in mineral oil. The resulting product was a satisfactory ink with a ratio of yield value to viscosity of 7. When tested on a high speed mist testing machine only a trace of mist was collected.

*Example 4*

An ink prepared from 73 parts of mineral oil, 6 parts Number 3 linseed oil to act as dispersing agent, 17 parts of channel carbon and 4 parts of antiflocculent dehydroabietyl amine had good flow properties. The viscosity was 8 poises and the yield value was 330 dynes per sq. cm. This ink printed satisfactorily on newsprint at a speed of 1200 feet per minute.

*Example 5*

Inks were made of the following compositions in which the deflocculent was a soft petroleum residue tar and the antiflocculent was a 50% solution in mineral oil of a mixed barium and zinc salt of mahogany acid. The mineral oil had a viscosity of 2 poises.

| Ink Number | 1 | 2 | 3 | 4 | 5 | 6 |
|---|---|---|---|---|---|---|
| Mineral Oil | 59 | 66 | 73 | 76 | 78.3 | 76 |
| Carbon Black | 30 | 25 | 20 | 17 | 17 | 20 |
| Dispersing Agent | 6 | 5 | 4 | 4 | 4 | 4 |
| Antiflocculent | 5 | 4 | 3 | 3 | 0.7 | 0 |
| Viscosity—poise | 31.7 | 12.7 | 7.06 | 4.1 | 5 | 10.9 |
| Yield Value, dynes per sq. cm | 1,950 | 0.0 | 0.0 | 0.0 | 46.2 | 1,040 |
| Ratio Yield Value to Viscosity | 62 | 0.0 | 0.0 | 0.0 | 9.2 | 95 |

Each of these inks printed satisfactorily except Number 6 which contained no antiflocculent and would not feed satisfactorily from the fountain. Each of the first four was free of misting and remained in a flowable condition after one month storage.

*Example 6*

An ink satisfactory for use in heat set printing was prepared as follows: A mixture of 3 parts of gilsonite and 7 parts of rosin both of which act as dispersing agents was dissolved in 63 parts of mineral seal oil and 2 parts of toluene. This was heated to 70° C. and 23 parts of unpressed channel carbon black was stirred in. After cooling to 30° C., 5 parts of a 50% solution in mineral oil of a mixed barium and zinc salt of mahogany acid was stirred in and the mixture given one pass over a 3 roller ink mill. The ink had a viscosity of 22.8 poises and a yield point of 127 dynes per sq. cm. This ink printed satisfactorily at 1200 feet per minute on both newsprint and coated paper. After standing two weeks the ink had acquired a slight body but would flow readily without stirring if the container was given only a slight jar.

The inks of this invention are based generally on a hydrocarbon vehicle and particularly on a mineral oil basis. The nature of the mineral oil is not particularly significant since highly refined white mineral oil, highly unsaturated oils, cyclic hydrocarbons and oils showing a considerable aromatic content have been used successfully. However, we have found that large amounts of dissolved resinous materials such as gilsonite and rosin contribute to the body and tack and are undesirable. In general the hydrocarbon oil will constitute in excess of 80% of the vehicle used to disperse the carbon and in our preferred inks in excess of 90%. The dispersing agents are often dark colored and if used in too large an amount will bleed into the paper and produce staining. The maximum amount of the antiflocculent will be governed by cost. However, more than 5% in the ink will produce little added effect, but will do no harm.

Having described my invention, what I claim as new and desire to secure by Letters Patent is:

1. A process for producing a printing ink having a carbon black content of at least 16% by weight of the ink and a ratio of yield value, in dynes per sq. cm., to plastic viscosity, in poises, of less than about 70 at 30° C., which comprises admixing said carbon black with a substantially hydrocarbon vehicle comprising at least 80% by weight of mineral oil, a dispersing agent selected from the group consisting of gilsonite, asphalt, asphaltic petroleum residues, rosin, limed rosin and bodied drying oil and an antiflocculent, said antiflocculent having the property of substantially preventing oil syneresis after four hours storage at 50° C. of an ink composed of 12 parts channel carbon black, 3 parts gilsonite and 83 parts mineral oil to which the antiflocculent is added in an amount equivalent to 4% by weight based on the ink.

2. A process for producing a printing ink having a ratio of yield value, in dynes per sq. cm., to plastic viscosity, in poises, of less than about 70 at 30° C., which comprises admixing carbon black in an amount of about 16% to 30% by weight of said ink with substantially hydrocarbon vehicle containing at least 80% by weight of mineral oil, a dispersing agent selected from the group consisting of gilsonite, asphalts, asphaltic petroleum residues, rosin, limed rosin and bodied drying oil and an antiflocculent, said antiflocculent having the property of substantially preventing oil syneresis after four hours storage at 50° C. of an ink composed of 12 parts channel carbon black, 3 parts gilsonite and 83 parts mineral oil to which the antiflocculent is added in an amount equivalent to 4% by weight based on the ink.

3. A process for producing a high speed printing ink having a carbon black content of at least 16% by weight of the ink, which comprises admixing an essentially mineral oil vehicle with said carbon black, a dispersing agent selected from the group consisting of gilsonite, asphalts, asphaltic petroleum residues, rosin, limed rosin and bodied drying oil and an antiflocculent, said antiflocculent comprising an alkaline earth metal salt of mahogany acid.

4. The process according to claim 3 wherein the alkaline earth metal salt of mahogany acid is a barium salt.

5. The process according to claim 3 wherein the alkaline earth metal salt of mahogany acid is a calcium salt.

6. A process for producing a printing ink having a carbon black content of at least 16% by weight of the ink and a ratio of yield value, in dynes per sq. cm., to plastic viscosity, in poises, of less than about 70 at 30° C., which comprises admixing said carbon black with a substantially hydrocarbon vehicle comprising at least 80% by weight mineral oil, a dispersing agent consisting of asphaltic petroleum residue and a barium salt of mahogany acid as antiflocculent.

7. A process for producing a printing ink having a carbon black content of at least 16% by weight of the ink and a ratio of yield value, in dynes per sq. cm., to plastic viscosity, in poises, of less than about 70 at 30° C., which comprises admixing said carbon black with a substantially hydrocarbon vehicle comprising at least 80% by weight mineral oil, a dispersing agent selected from the group consisting of gilsonite, asphalts, asphaltic petroleum residues, rosin, limed rosin and bodied drying oil and a dibutylamine salt of mahogany acid as an antiflocculent.

8. A process for producing a printing ink having a carbon black content of at least 16% by weight of the ink and a ratio of yield value, in dynes per sq. cm., to plastic viscosity, in poises, of less than about 70 at 30° C., which comprises admixing said carbon black with a substantially hydrocarbon vehicle comprising at least 80% by weight mineral oil, a dispersing agent selected from the group consisting of gilsonite, asphalts, asphaltic petroleum residues, rosin, limed rosin and bodied drying oil, and dehydro abietyl amine as an antiflocculent.

9. A process for producing a printing ink having a carbon black content of at least 16% by weight of the ink and a ratio of yield value, in dynes per sq. cm., to plastic viscosity, in poises, of less than about 70 at 30° C., which comprises admixing said carbon black with a substantially hydrocarbon vehicle comprising at least 80% by weight mineral oil, a dispersing agent selected from the group consisting of gilsonite, asphalts, asphaltic petroleum residues, rosin, limed rosin and bodied drying oil and sorbitol sesquioleate as an antiflocculent.

10. A high speed black printing ink having a ratio of yield value, in dynes per sq. cm., to plastic viscosity, in poises, of less than about 70 at 30° C., comprising a substantially hydrocarbon vehicle comprising at least 80% by weight of mineral oil, carbon black, a dispersing agent and an antiflocculent, said carbon black constituting between about 16% and 30% by weight of the ink, said dispersing agent being selected from the group consisting of gilsonite, asphalts, asphaltic petroleum residues, rosin, limed rosin and bodied drying oil, and said antiflocculent having the property of substantially preventing oil syneresis after four hours storage at 50° C. of an ink composed of 12 parts channel carbon black, 3 parts gilsonite and 83 parts mineral oil to which the antiflocculent is added in an amount equivalent to 4% by weight based on the ink.

11. A black printing ink having a ratio of yield value, in dynes per sq. cm., to plastic viscosity, in poises, of less than about 70 at 30° C. comprising in admixture with carbon black a substantially hydrocarbon vehicle comprising at least 80% by weight of mineral oil, a dispersing agent selected from the group consisting of gilsonite, asphalts, asphaltic petroleum residues, rosin, limed rosin and bodied drying oil and an alkaline earth metal salt of mahogany acid as an antiflocculent, said carbon black being at least 16% by weight of the ink.

12. The product of claim 11 wherein the alkaline earth metal salt of mahogany acid is a barium salt.

13. The product according to claim 11 wherein the alkaline earth metal salt of mahogany acid is a calcium salt.

14. A black printing ink having a ratio of yield value, in dynes per sq. cm., to plastic viscosity, in poises, of less than about 70 at 30° C. comprising in admixture with carbon black a substantially hydrocarbon vehicle comprising at least 80% by weight of mineral oil, a dispersing agent selected from the group consisting of gilsonite, asphalts, asphaltic petroleum residues, rosin, limed rosin and bodied drying oil and a dibutylamine salt of mahogany acid as an antiflocculent.

15. A black printing ink having a ratio of yield value, in dynes per sq. cm., to plastic viscosity, in poises, of less than about 70 at 30° C. comprising in admixture with carbon black a substantially hydrocarbon vehicle comprising at least 80% by weight of mineral oil, a dispersing agent selected from the group consisting of gilsonite, asphalts, asphaltic petroleum residues, rosin, limed rosin and bodied drying oil and dehydro abietyl amine as an antiflocculent.

16. A black printing ink having a ratio of yield value, in dynes per sq. cm., to plastic viscosity, in poises, of less than about 70 at 30° C. comprising in admixture with carbon black a substantially hydrocarbon vehicle comprising at least 80% by weight of mineral oil, a dispersing agent selected from the group consisting of gilsonite, asphalts, asphaltic petroleum residues, rosin, limed rosin and bodied drying oil and sorbitol sesquioleate as an antiflocculent.

References Cited in the file of this patent

UNITED STATES PATENTS

| | | |
|---|---|---|
| 2,062,159 | Brizzolara et al. | Nov. 24, 1936 |
| 2,220,952 | Brill | Nov. 12, 1940 |
| 2,453,558 | Voet | Nov. 9, 1948 |
| 2,675,320 | Cristopher et al. | Apr. 13, 1954 |

FOREIGN PATENTS

| | | |
|---|---|---|
| 360,948 | Great Britain | Nov. 9, 1931 |

OTHER REFERENCES

Ellis: "Printing Inks," Reinhold 1940, p. 217.
Schwartz-Perry: "Surface Active Agents," Inter Science Publishers, 1949, pp. 94, 230, 324, 325, and 487.